Patented June 13, 1933

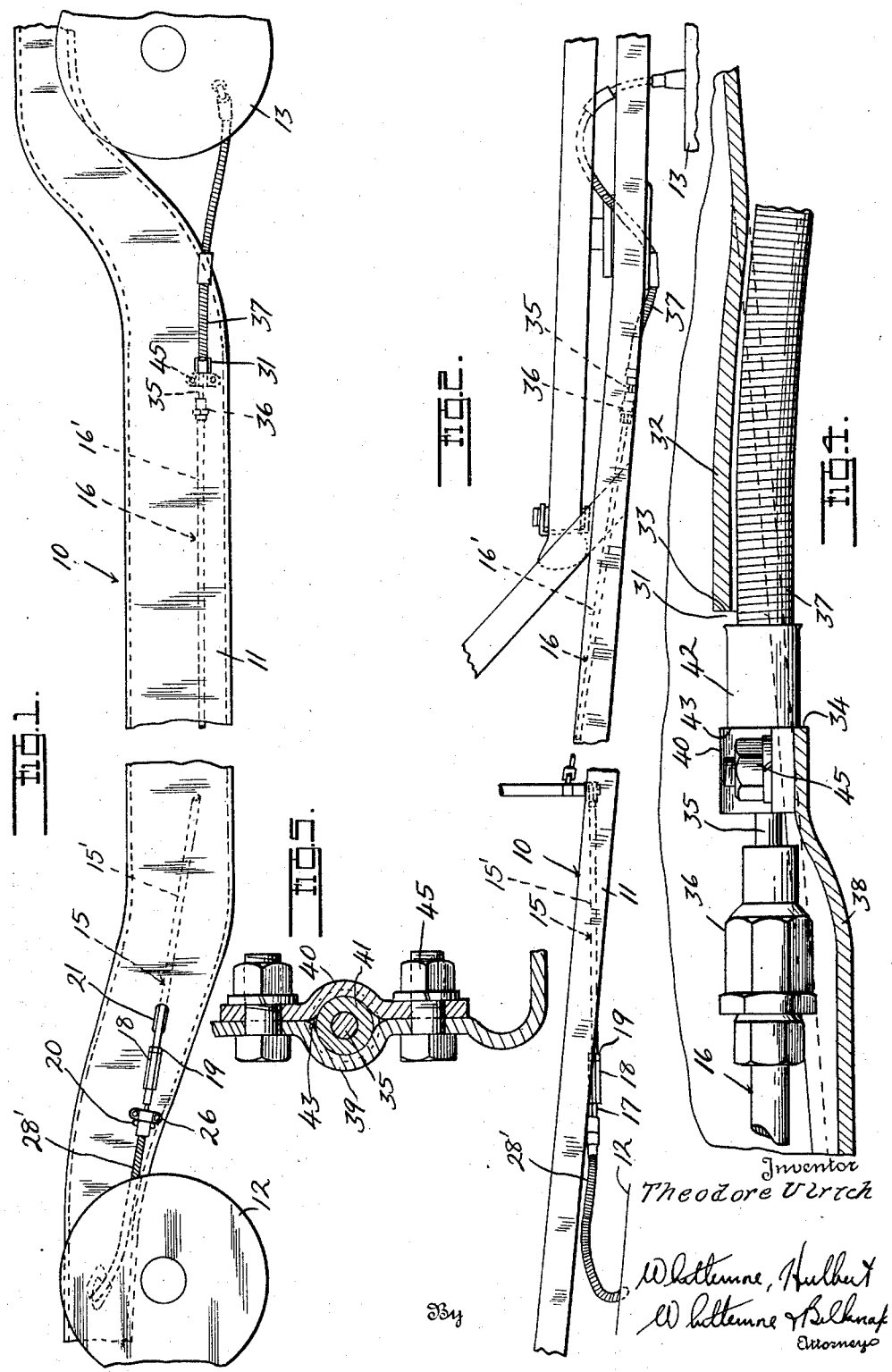

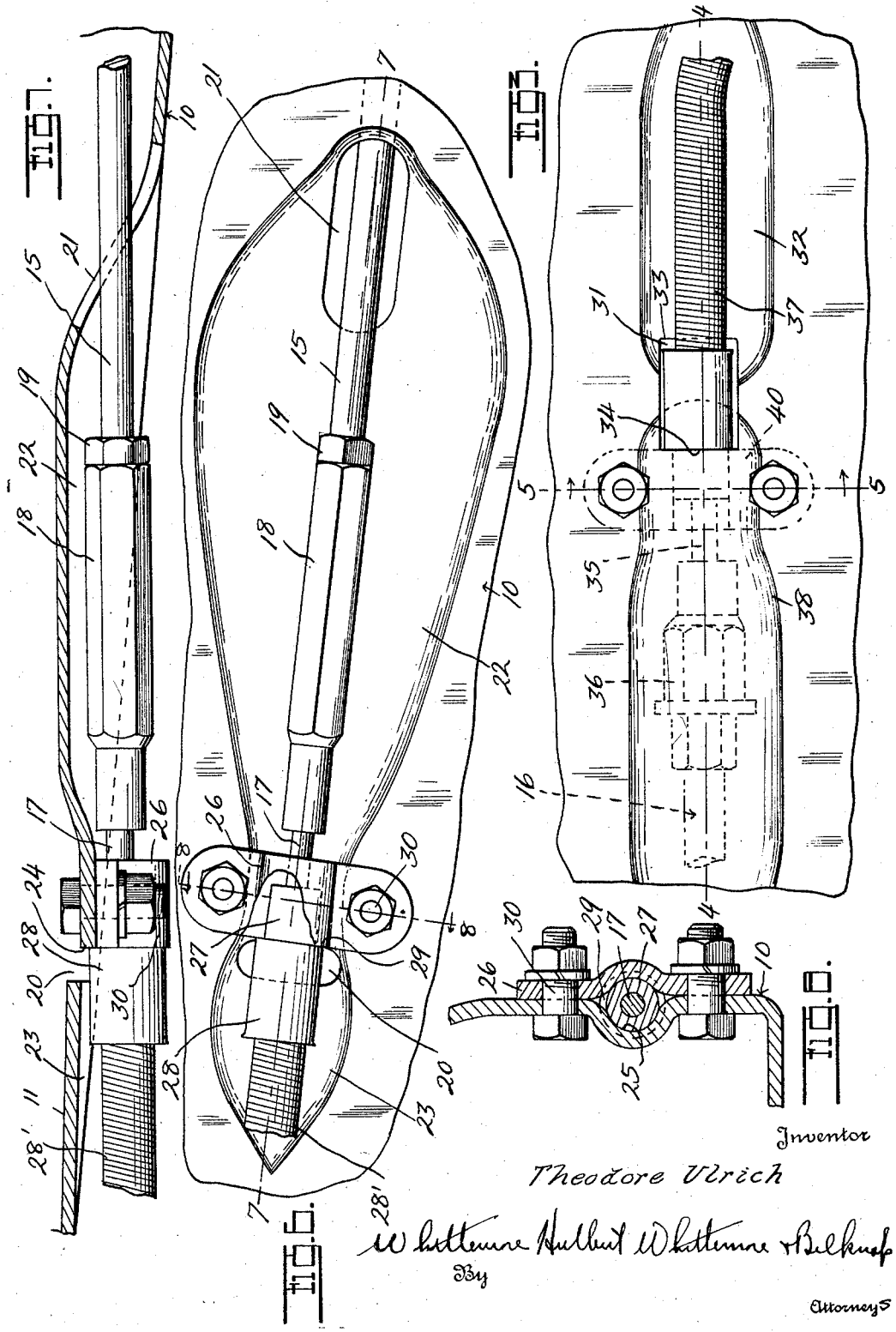

1,913,524

UNITED STATES PATENT OFFICE

THEODORE ULRICH, OF DETROIT, MICHIGAN, ASSIGNOR TO HUPP MOTOR CAR CORPORATION, OF DETROIT, MICHIGAN, A CORPORATION OF VIRGINIA

MOTOR VEHICLE CONSTRUCTION

Application filed May 23, 1932. Serial No. 613,063.

This invention relates generally to vehicle chassis construction and refers more particularly to improved means for supporting brake rods or other accessories from the chassis frame.

Heretofore it has been customary to secure the various brake operating rods to the side sills of the chassis frame by means of relatively heavy castings permanently fixed to the side sills. The foregoing arrangement while satisfactory in effecting the desired results is, nevertheless, inefficient from the standpoint of manufacture since the combined weight of the castings appreciably adds to the weight of the chassis and materially increases the cost of production.

It is therefore one of the principal objects of the present invention to reduce the weight as well as the cost of manufacture of motor vehicle chassis by providing a relatively light and inexpensive mounting for the brake rods on the chassis frame.

The foregoing as well as other objects will be made more apparent as this description proceeds, especially when considered in connection with the accompanying drawings, wherein:

Figure 1 is a fragmentary side elevational view of a chassis having brake rods mounted thereon in accordance with the present invention;

Figure 2 is a fragmentary top plan view of the construction shown in Figure 1;

Figure 3 is an enlarged fragmentary side elevational view of a portion of the chassis frame illustrating the mounting for one of the rear brake rods;

Figure 4 is a longitudinal sectional view taken substantially on the line 4—4 of Figure 3;

Figure 5 is a transverse sectional view taken on the line 5—5 of Figure 3;

Figure 6 is a fragmentary side elevational view of a portion of the chassis frame illustrating the mounting provided for one of the front brake rods;

Figure 7 is a longitudinal sectional view taken on the line 7—7 of Figure 6;

Figure 8 is a transverse sectional view taken on the line 8—8 of Figure 6.

Inasmuch as motor vehicles as now commercially produced are usually provided with four-wheel brakes, I have shown my invention for the purpose of illustration as associated with vehicles of this character. In view of the fact that one side of the chassis frame is substantially a duplicate of the other, specific reference will be made to only one side in the following description.

In detail, there is fragmentarily illustrated in Figure 1 a chassis frame 10 having a side sill 11 and having front and rear brakes 12 and 13, respectively. The front and rear wheel brakes are of conventional construction and are operatively connected to a transversely extending rockshaft 14 in the usual manner by means of brake rod assemblies 15 and 16, respectively. The rockshaft 14 is journaled in any suitable manner upon the side sills of the frame and is preferably connected to a suitable control lever (not shown) for actuation thereby.

As shown particularly in Figure 1, the brake rod assemblies comprises rods 15' and 16' respectively connected to the brakes 12 and 13 for actuating the latter by means of flexible cables so designed as to permit unobstructed movement of the brakes relative to the chassis frame. The cable connecting the end of the rod 15' to the brake 12 is designated herein by the reference character 17, and, as shown particularly in Figures 6 and 7, is adjustably connected to the rod 15'. The aforesaid adjustable connection comprises a nut 18 swivelly connected to the rear end of the cable 17 in the usual way and threadedly mounted upon the forward end of the rod 15' so that rotation of the nut varies the effective length of the operative connection between the rockshaft and brake 12. The nut 18 is preferably held in its various adjusted positions by means of a lock nut 19 threadedly mounted upon the rod 15 in a position to engage the rear end of the adjustable nut 18.

In the present instance, the rear end portion of the cable 17 is detachably anchored to the side sill 11 of the frame, and for accomplishing this result, the vertical web portion of the side sill 11 is provided with longitudinally spaced openings 20 and 21 therethrough on opposite sides of the connection between the cable and brake rod 15'. Subsequent to forming the openings aforesaid in the vertical web of the side sill 11, the portions of the web opposite the connection between the brake rod 15' and cable 17 are fashioned as indicated in Figures 6 and 7 to form longitudinally spaced inwardly extending depressions 22 and 23. In forming the depression 22 in the side sill, the forward edge of the opening 21 is displaced inwardly relative to the rear edge thereof and provided for extending the forward portions of the brake rod 15' through the vertical web of the sill to a position adjacent the outer side of the latter with the adjusting nut 18 located opposite the depression 22. The depth of the depression is so determined as to provide ample clearance for the adjusting nut and permits convenient manipulation of the same from a position exteriorly of the chassis frame.

In forming the depression 23, the forward edge of the opening 20 is displaced inwardly relative to the rear edge of the same forming a shoulder 24 and the portion of the web between the shoulder 24 and depression 22 is fashioned to form an inwardly extending substantially semi-circular depression 25. The depression 25 in the side sill cooperates with a suitable cap 26 for clamping the reduced rear end portion 27 of a terminal member 28 to the vertical web of the side sill. The terminal member 28 is fixed to the rear end of a flexible conduit 28' through which the cable 17 extends, and the reduced portion 27 of the terminal member forms an annular shoulder 29 arranged to abut the shoulder 24 on the side sill as well as the forward edge of the cap 26. The cap 26 is preferably detachably secured to the outer side of the vertical web portion of the side sill between the depressions 22 and 23 by means of the bolts 30, with the result that the same may be readily assembled with or removed from the frame. Thus, from the foregoing, it will be apparent that portions of the side sill cooperate with the cap 26 to form an efficient clamp for the brake rod assembly 15. It will further be apparent from the above construction that the reaction of the brake rod is transferred directly to the side sill 11 in a direction substantially in the plane of the web of the latter by reason of the cooperating engaging shoulders 24 and 29 respectively on the conduit 28' and side sill 11. This latter feature relieves the bolts 30 of the reaction stresses and permits the same as well as the cap to be formed relatively light.

While the brake rod assembly 16 between the rockshaft 14 and rear brake 13 may be identical to the connection hereinbefore described, if desired, nevertheless, I have found it to be more practical in certain instances to provide the following construction featured in Figures 3 to 5, inclusive. As shown particularly in Figures 3 and 4, the vertical web of the side sill 11 adjacent the rear end thereof is provided with an opening 31 therethrough, and portions of the web in rear of the opening 31 are depressed inwardly as at 32. In depressing the portions 32 inwardly, the rear marginal edge 33 of the opennig 31 is displaced laterally inwardly relative to the front marginal edge 34 of the opening and provides for extending the brake rod 16' through the vertical web of the side sill as shown in Figure 4.

In the present instance, the rear end of the brake rod 16' is connected to the forward end of a flexible cable 35 extending from the brake 13 by means of a suitable coupling 36, and the latter cable 35 is supported within a flexible conduit 37 which in turn is clamped to the side sill 11 of the frame in a manner to be presently described. While the coupling 36 may be of the adjustable type, nevertheless, I have not shown it as such in the present instance, since it is located upon the inner side of the side sill 11 rendering it relatively inaccessible for manipulation. In the illustrative embodiment of the invention, adjustment of the brake rod is accomplished by the usual compensating connection between the rod and rockshaft (not shown in detail herein). In constructions wherein the coupling 36 is located in proximity to the opening 31 through which the cable extends to the exterior of the frame as in the present instance, it is necessary to displace a portion of the vertical web of the sill 11 outwardly as at 38 to provide sufficient clearance for the coupling. However, the necessity of forming the depression 38 may be obviated by increasing the length of the rod 16' so as to provide for locating the coupling at a point where sufficient clearance is normally provided between the coupling and the side sill of the frame.

As previously stated, the flexible conduit for the cable 35 is anchored to the side sill of the frame and this is accomplished herein by fashioning the portion of vertical web of the side sill adjacent the marginal edge 34 of the opening to form an outwardly extending semi-circular depression 39. The semi-circular depression 39 is similar in purpose to the depression 25 hereinbefore described in that it cooperates with a suitable cap 40 to clamp the reduced portion 41 on the forward end of a terminal member 42 to the side sill. The terminal member 42 is fixed to the forward end of the flexible conduit 37, and the reduced portion 41 thereof forms an annular shoulder 43 which serves to abut the marginal edge 34 of the opening 31, as well as the rear edge of the cap 40. As clearly shown in Figure 4, the enlarged portion of the coupling is located within the opening 31, while the portion of the conduit adjacent thereto is located in the depression 32, with the result that ample clearance is provided for these parts.

As will be observed from the foregoing, the cap 40 is upon the inner side of the vertical web of the side sill and is detachably clamped thereto by means of bolts and nuts 45. As in the previously described construction, the reaction of the brake rod connection is taken through the side sills by reason of the engagement of the shoulder 43 on the terminal member with the shoulder 34 on the vertical web of the side sill.

From the foregoing description, it will be apparent that I have provided relatively simple and inexpensive anchorage means for the brake rods of a vehicle chassis distinguished by the relatively few number of parts involved and the negligible weight of these parts as compared to constructions of the type hereinbefore employed for this purpose. It will also be observed that the anchorage means illustrated herein provides for transferring the reaction of the brake rods to the side sills of the frame substantially in the plane of the vertical web portions of the latter.

While in the illustrative embodiment of the invention the anchorage means for the front and rear brake rods differ slightly from each other, nevertheless, it is to be noted that under certain conditions, it may be desirable to form the anchorage means for both brake rod assemblies either identical to the means defined in connection with the front rod assemblies 15 or identical to the construction defined in connection with the rear brake rod assembly 16, and, accordingly, reservation is made to make such changes as may come within the purview of the accompanying claims.

What I claim as my invention is:

1. A vehicle chassis construction having in combination, a side sill provided with a vertical web portion having an opening therethrough with the front and rear edges of the opening offset laterally relative to each other, a brake rod member provided with a terminal portion engageable in a depression formed in the web of the sill adjacent one of the aforesaid edges of the opening, and a cap detachably secured to the sill and having a portion cooperating with said depression to clamp the terminal portion aforesaid to said web.

2. A vehicle chassis construction having in combination, a side sill provided with a vertical web portion having an opening therethrough with the front and rear edges thereof offset laterally relative to each other, a brake rod member provided with a terminal element having a reduced portion engageable in a depression formed in the web of the sill adjacent one of the edges aforesaid of the opening with the shoulder formed thereby in abutting relation with the latter edge of the opening, and a cap detachably secured to the side sill and engageable with the reduced portion of the terminal element for clamping the same within said depression.

3. A vehicle chassis construction having in combination, a side sill provided with a vertical web portion having an opening therethrough and having a portion adjacent one edge of the opening laterally offset to provide a depression, a brake rod member extending opposite the depression and having a terminal portion provided with a reduced end engageable in a depression formed in the portion of the web adjacent the edge of the opening opposite the edge aforesaid, and a cap member detachably secured to the side sill and engageable with the reduced end of the terminal portion for clamping the same to the web with the shoulder formed by said reduced portion in abutting relation with the last mentioned edge of the opening.

4. A vehicle chassis construction having in combination, a side sill provided with a vertical web portion fashioned to form a depression in one side thereof, a brake rod member having a terminal portion seated within said depression, and detachable means for clamping the terminal portion of said member in the depression aforesaid.

5. A vehicle chassis construction having in combination, a side sill provided with a vertical web having a portion laterally offset to form a shoulder and fashioned with a depression in one side thereof, a member having a reduced portion seated within the depresson with the shoulder formed thereby in abutting relation to the shoulder aforesaid on the web, and means cooperating with the depressed portion of the web for clamping the member to the sill.

6. A vehicle chassis construction having in combination, a side sill provided with a vertical web having an opening therethrough and having the portion adjacent one side edge of the opening offset laterally relative to the portion at the other side edge of the opening, a brake rod assembly extending from a position adjacent one side of the web through the opening to a position adjacent the opposite side of the web, means for supporting the brake rod assembly from the sill including a member having a terminal portion engageable in a depression formed in the portion of the web adjacent one of the edges aforesaid of the opening, and means cooperating with the web to clamp the terminal portion within the depression aforesaid.

7. A vehicle chassis construction having in combination, a side sill provided with a vertical web having an opening therethrough and having the portion adjacent one side edge of the opening offset laterally relative to the portion at the other side edge of the opening, a brake rod assembly extending from a position adjacent one side of the web through the opening to a position adjacent the opposite side of the web, means for supporting the brake rod assembly from the sill including a member provided with a terminal element located within the opening and having a reduced portion engageable within a laterally extending depression formed in the portion of the web adjacent the second named edge aforesaid of the opening with the shoulder formed by the reduced portion in abutting engagement with the latter edge of the opening, and a cap having a portion detachably secured to the web and having another portion engageable with the reduced portion of the terminal element for clamping the same in said depression.

8. A vehicle chassis construction having in combination, a side sill provided with a vertical web having an opening therethrough and having a portion at one side of the opening bent laterally to form a depression, a brake rod extending from a position adjacent one side of the web through the opening to a position adjacent the opposite side of the web within the depression aforesaid, a member adjustably secured to the rod opposite the depression, supporting means for said member and rod, and means cooperating with the web for clamping the supporting means to the sill.

9. A vehicle chassis construction having in combination, a side sill provided with a vertical web portion having a portion bent laterally to form a depression, a brake rod assembly extending adjacent the web and having a portion seated within said depression, and means cooperating with the web for clamping the portion aforesaid of the assembly in said depression.

10. A vehicle chassis construction having in combination, a side sill having a vertical web portion fashioned to provide an opening therethrough extending transversely of the same and having a portion adjacent one edge of the opening bent laterally to form a depression in the web, a brake rod assembly extending through the opening and having a portion seated within the depression provided with a shoulder engageable with one edge of said opening for transferring the torque reactions of the assembly to the sill, and a cap member engageable with the portion aforesaid of the assembly for clamping the same within said depression.

11. A vehicle chassis construction having in combination, a side sill provided with a vertical web portion having an opening therethrough and having a portion at one side of the opening bent laterally to form a depression, a brake rod assembly extending from a position adjacent one side of the web through the opening to a position adjacent the opposite side of the web within the depression, means for supporting the brake rod assembly from the sill including a member telescopically engaging the assembly and having a portion located within a depression formed in the web adjacent the depression aforesaid, and a cap engageable with the portion aforesaid of said member for clamping the same in said last mentioned depression.

In testimony whereof I affix my signature.

THEODORE ULRICH.